United States Patent
Debois

(10) Patent No.: US 6,381,590 B1
(45) Date of Patent: Apr. 30, 2002

(54) REMOTE POSTAGE METER RESETTING SYSTEM HAVING ALTERNATE POSTAGE FUNDING SOURCES

(75) Inventor: Elise R. Debois, West Harrison, NY (US)

(73) Assignee: Pitney Bowes Inc., Stamford, CT (US)

(*) Notice: Subject to any disclaimer, the term of this patent is extended or adjusted under 35 U.S.C. 154(b) by 0 days.

(21) Appl. No.: 09/470,584

(22) Filed: Dec. 22, 1999

Related U.S. Application Data

(63) Continuation of application No. 08/904,323, filed on Jul. 31, 1997, now Pat. No. 6,010,069.

(51) Int. Cl.$^7$ .............................................. G06F 17/60

(52) U.S. Cl. .......................... 705/61; 705/400; 705/401; 705/402; 705/403

(58) Field of Search ........................... 705/51, 61, 400, 705/401, 402, 403

(56) References Cited

U.S. PATENT DOCUMENTS

| | | | |
|---|---|---|---|
| 4,097,923 A | 6/1978 | Eckert, Jr. et al. | 340/900 |
| 4,376,299 A * | 3/1983 | Rivest | 364/900 |
| 4,447,890 A | 5/1984 | Duwel et al. | 364/900 |
| 5,224,046 A | 6/1993 | Kim et al. | 364/464.02 |
| 5,359,182 A * | 10/1994 | Schilling | 235/380 |
| 5,428,353 A * | 6/1995 | Bird | 340/933 |
| 5,469,497 A | 11/1995 | Pierce et al. | 379/115 |
| 5,602,742 A | 2/1997 | Solondz et al. | 364/464.2 |

FOREIGN PATENT DOCUMENTS

| | | | |
|---|---|---|---|
| EP | 0475780 A2 * | 3/1992 | G07B/17/02 |

OTHER PUBLICATIONS

Chen, Anne; Small business gets in line for e–post office, eWEEK, Oct. 10, 1999.*

* cited by examiner

Primary Examiner—James P. Trammell
Assistant Examiner—Cristina Owen Sherr
(74) Attorney, Agent, or Firm—Steven J. Shapiro; Angelo N. Chaclas

(57) ABSTRACT

A remote postage meter resetting system includes apparatus for sending a request to recharge the postage meter by the postage recharge amount together with first data indicative of a first user prepaid postage account resident in a prepaid postage account data base having a plurality of prepaid postage accounts; and a data center including apparatus for receiving from the sending apparatus the first data together with the request to recharge the postage meter by the postage recharge amount; a line of credit database having a plurality of lines of credit each of which is associated with at least one of the plurality of prepaid postage accounts; a computer, in communication with the receiving apparatus, which is programmed to 1) obtain the first data and the postage recharge amount from the receiving apparatus, and 2) communicate with the prepaid postage account data base to determine if sufficient funds are in the first user prepaid postage account to cover the cost of the postage recharge amount, wherein at times when the computer determines that sufficient funds are not available in the first user account to cover the cost of the postage recharge amount the computer is programmed to automatically 1) communicate with the line of credit data base to determine if one of the plurality of lines of credit is associated with the first user prepaid postage account and 2) generate and send enabling data via the receiving apparatus to the sending apparatus only if the computer determines that one of the plurality of lines of credit is associated with the first user prepaid postage account; and structure for obtaining the enabling data from the sending apparatus and for providing the postage meter with the enabling data to effectuate resetting of the postage meter by the postage recharge amount.

2 Claims, 5 Drawing Sheets

REMOTE POSTAGE METER RESETTING SYSTEM HAVING ALTERNATE POSTAGE FUNDING SOURCES

CROSS REFERENCES TO RELATED APPLICATIONS

This application is a continuation of U.S. patent Ser. No. 08/904,323, now U.S. Pat. No. 6,010,069 filed Jul. 31, 1997.

FIELD OF THE INVENTION

The instant invention relates to remote postage meter resetting systems, and more particularly to remote postage meter resetting systems with alternate postage funding sources.

BACKGROUND OF THE INVENTION

Postage meters are devices for dispensing value in the form of postage printed on a mailpiece such as an envelope. The term postage meter also includes other similar meters that dispense an indication of value such as parcel post meters and tax stamp machines. Postage meters of this type print and account for postage (value) stored within the meter.

Since the above mentioned postage meters have a finite amount of postage value (to be dispensed) stored therein, they will eventually run out of stored postage value such that the postage meter is disabled from printing postage until additional postage value is added to the postage meter. Remote meter resetting systems have been developed which provide the capability of having postage added to these postage meters without requiring the postage meter to be physically brought into the post office. Examples of such conventional remote postage meter resetting systems are shown, for example, in U.S. Pat. Nos. 4,447,890 and 4,097,923, each of which are incorporated herein by reference.

While the aforementioned remote postage meter resetting systems work very well and include complex security features to ensure that the integrity of the system is not compromised, there is still a basic limitation in these systems which impacts the user of the postage meter. That is, generally the known postage meter resetting systems consist of a remote data center that is in communication with the postage meter user via a telephone line. The user indicates via the telephone line the amount of postage that is to be added to the postage meter. The remote data center, upon receipt of this information, then communicates with an accounting data base which has a user account associated with the individual user and the specific meter or meters in the possession of that user. The user account has funds therein which the user has prepaid by sending a check to the postal authority. Thus, if the user account has sufficient funds to cover the amount of postage requested by the user to be added to the postage meter, the data center determines this and provides the user, via the telephone line, with a resetting code which permits the desired postage funds to be added to the meter. The user account is then debited by the amount of the funds added to the meter. However, if the user account has insufficient funds to cover the requested postage to be added to the postage meter, the user is advised that such is the case and the postage reset transaction is terminated without postage being added to the postage meter. In this situation, the user would have to send a check to the postal authority to increase the amount of funds in the user account before postage could be added via the postage meter resetting system to the postage meter. Depending upon the speed at which the user can write a check and get it to the postal authority, several days or more could pass before the postage meter can be recharged with postage funds via the remote resetting system. Accordingly, if the user had utilized all of the funds in the postage meter prior to attempting to recharge the meter and the user account had insufficient funds therein, the user would not be able to dispense postage via their meter thereby preventing the mailing of potentially important mailpieces or requiring a trip to the post office to accomplish the necessary mailing thereby defeating the benefits of having a postage meter in the first place.

In order to overcome the above problem, some users have actually been known to have a backup postage meter which is utilized in the event that the first meter runs out of funds and can't be recharged because of insufficient funds in the user account. While this solution certainly helps, the user is paying to rent two meters when, based on their mail volume, they only really need one.

SUMMARY OF THE INVENTION

It is an object of the invention to provide a remote postage meter resetting system which overcomes the problems discussed above with the prior art systems by permitting a postage funds resetting request to be completed even if there are insufficient funds available in the user's prepaid postage account to cover the amount of postage requested to be added to the postage meter.

The above object is met by providing a remote postage meter resetting system having apparatus for sending a request to recharge the postage meter by the postage recharge amount together with first data indicative of a first user prepaid postage account resident in a prepaid postage account data base having a plurality of prepaid postage accounts; and a data center including apparatus for receiving from the sending apparatus the first data together with. the request to recharge the postage meter by the postage recharge amount; a line of credit database having a plurality of lines of credit each of which is associated with at least one of the plurality of prepaid postage accounts; a computer, in communication with the receiving apparatus, which is programmed to 1) obtain the first data and the postage recharge amount from the receiving apparatus, and 2) communicate with the prepaid postage account data base to determine if sufficient funds are in the first user prepaid postage account to cover the cost of the postage recharge amount, wherein at times when the computer determines that sufficient funds are not available in the first user account to cover the cost of the postage recharge amount the computer is programmed to automatically 1) communicate with the line of credit data base to determine if one of the plurality of lines of credit is associated with the first user prepaid postage account and 2) generate and send enabling data via the receiving apparatus to the sending apparatus only if the computer determines that one of the plurality of lines of credit is associated with the first user prepaid postage account; and structure for obtaining the enabling data from the sending apparatus and for providing the postage meter with the enabling data to effectuate resetting of the postage meter by the postage recharge amount.

Additional objects and advantages of the invention will be set forth in the description that follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention. Furthermore, like reference numerals are used to describe similar components in the various Figures.

DETAILED DESCRIPTION OF THE PREFERRED EMBODIMENTS

Figure 1:
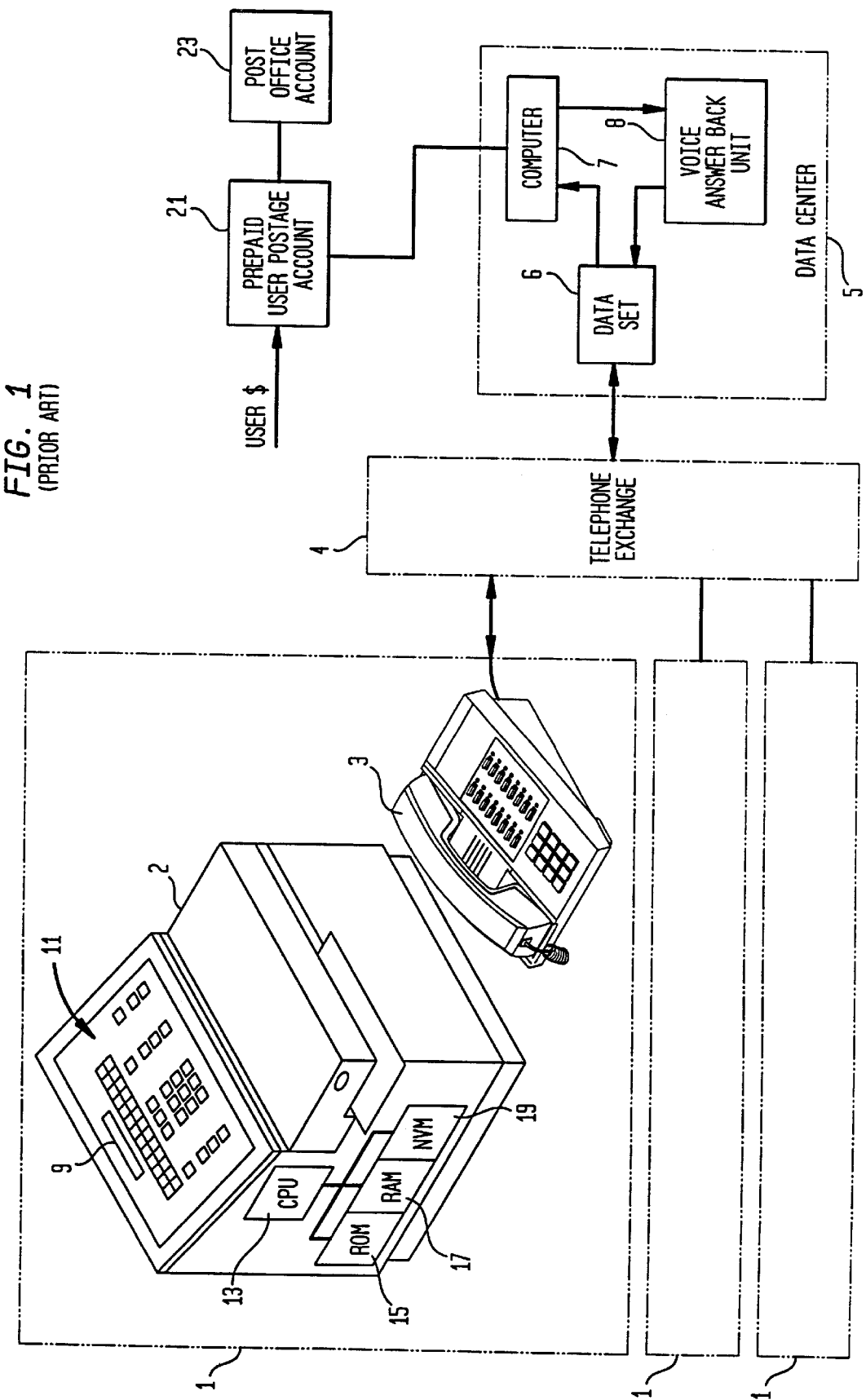
FIG. 1 is a schematic block diagram of a first prior art postage meter resetting system.

Referring to FIG. 1, a schematic block diagram of a conventional remote postage meter resetting system is shown. A plurality of blocks 1 represent remote postage meter stations capable of communicating with a data center 5. The remote postage meter stations 1 communicate with data center 5 via telephone exchange equipment generally indicated at 4. The transmitter-receiver at each remote station 1 is a conventional tone signaling telephone 3. Telephone 3 is used to establish two way communications between postage meter station 1 and data center 5.

Data center 5 includes a data set 6 of known construction which receives frequency encoded data input from telephone 3 of any of the remote postage meters stations 1 and transforms this input into a suitable machine language for use by a computer 7 of data center 5. Computer 7, in turn, controls in a conventional manner a known voice-answer back unit 8. Voice answer back unit 8 formulates voice responses for transmission back to the particular postage meter station 1, via the telephone exchange 4.

Each remote postage meter station 1 includes a known electronic postage meter 2. Postage meter 2 includes a display 9, a keyboard 11, a central processing unit 13 (or a plurality of CPU's operating together), a ROM 15, a RAM 17, and nonvolatile memory 19. The CPU 13 controls operation of the meter 2 including the keyboard 11 and display 9 so that information can be input by the user to the postage meter 2 via the keyboard 11 and displayed in display. 9. Similarly, display 9 displays information or prompts from postage meter 2 to solicit input from or to communicate information to the postage meter user.

ROM 15 has stored therein the operating programs of the postage meter 2 which are executed by CPU 13, while RAM 17 acts as a temporary working memory utilized during program execution. NVM 19 typically has stored therein the postage accounting register of the meter which conventionally include: an ascending register which is indicative of the lifetime total amount of postage printed by the postage meter 2, a descending register which is indicative of the amount of available postage remaining in the postage meter, and a control sum register which represents the sum of the ascending and descending registers. Each of the aforementioned accounting register are changed, as required, when postage is dispensed from or added to the postage meter under the control of the CPU 13 operating in accordance with programming stored in ROM 15.

Postage is remotely funded into postage meter 2 by first telephoning data center 5 via telephone 3. The postage meter user provides the data center 5 with the meter serial number, the last readings of the ascending and descending registers, a user account number, and the amount of postage that is desired to be added to the postage meter 2. Computer 7 verifies the authenticity of the call in a known manner and communicates with a prepaid user postage account data base 21 to determine if the specified user account has enough prepaid funds therein to cover the amount of postage which is desired to be added to the postage meter 2. If sufficient funding exists in the user account, the user accounted is debited by the requested postage amount and a computer associated with data base 21 sends funds equivalent to the postage amount to be added to the postage meter 2 to a specified Post Office account 23. Computer 7 then formulates a resetting combination which is at least partially based on the meter serial number and the requested postage amount. This combination is transmitted to the user via the voice answer back unit 8, data set 6, telephone exchange 4, and telephone 3. Having received the combination code, the user unlocks the meter, keys in the desired postage to be added via the keyboard 11, and enters the combination. The meter 2 contains a program in ROM 15 that utilizes the entered desired postage amount and generates an internal combination based on that amount. If the internally generated combination and the entered combination are the same, the accounting registers are appropriately changed by CPU 13 thereby adding the desired postage to postage meter 2.

In the event that computer 7 determines that there is insufficient postage in the user account to cover the desired postage increase to postage meter 2, a response is received via telephone 3 advising that such is the case and terminating the transaction.

Figure 2:
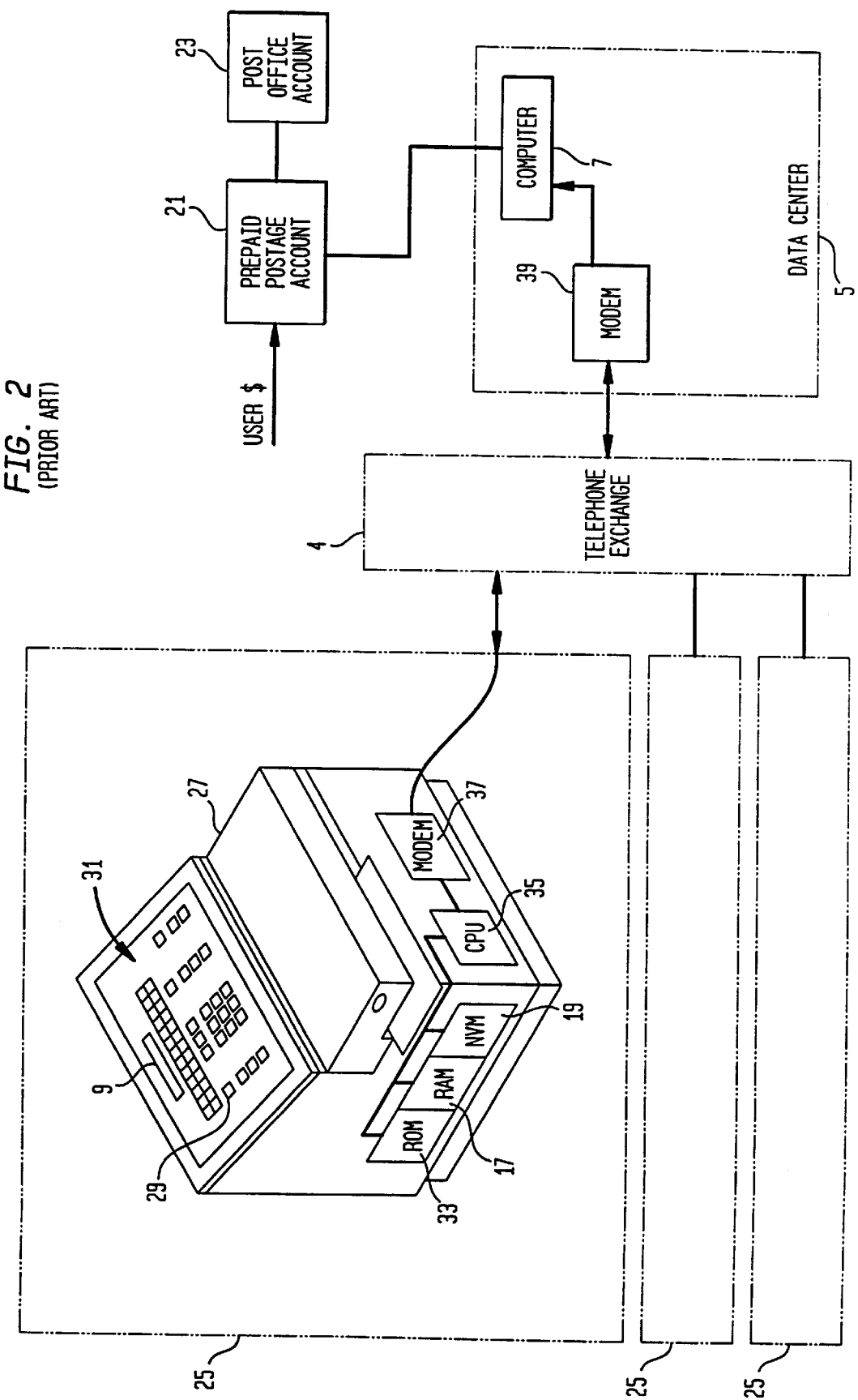
FIG. 2 is a schematic block diagram of a second prior art postage meter resetting system.

FIG. 2 shows a second conventional postage meter resetting system which is very similar to the system of FIG. 1 except that it is more fully automated requiring the user to only establish communication with the data center 5 via the remote postage meter station 25 and to provide the data center 5 with the desired postage amount to be added to postage meter 27. The remaining download of the combination from the data center 5 to meter 27, the internal generation of the combination by the meter 27, the comparison of the combinations, and the subsequent addition of postage by changing accounting register values are automatically accomplished under the control of CPU 35.

In operation, the user presses a designated button 29 of keyboard 31, which button 29 indicates that a remote postage refill is desired. Programming in ROM 33 causes CPU 35 to prompt the user via display 9 to enter, via keyboard 31, the amount of postage desired. Once the user responds, CPU 35 activates a modem 37 which automatically dials data center 5 and establishes communication therewith via a modem 39 at data center 5. CPU 35, via modems 37, 39 and telephone exchange 4 automatically provides the necessary register readings, the meter serial number, the prestored user account number, and the amount of postage desired to computer 7. Computer 7 then authenticates the call and communicates with prepaid postage account 21 to determine whether or not sufficient funds exist in the specified user account to cover the desired postage to be added to postage meter 27. If sufficient funds are available, debiting of the user account and the sending of postage funds to the post office account 23 are accomplished as previously discussed in connection with FIG. 1. However, in the system of FIG. 2, the combination code generated by computer 7 is sent directly to the CPU 35 from computer 7 via modems 39,37 and telephone exchange 4. CPU 35 then generates a combination code as previously discussed in connection with CPU 13 of FIG. 1, compares the generated code to the received code, and adds postage to the meter by changing the accounting registers if the codes match. Thus, the system of FIG. 2 requires less user input to accomplish the adding of postage to postage meter 27.

Figure 3:
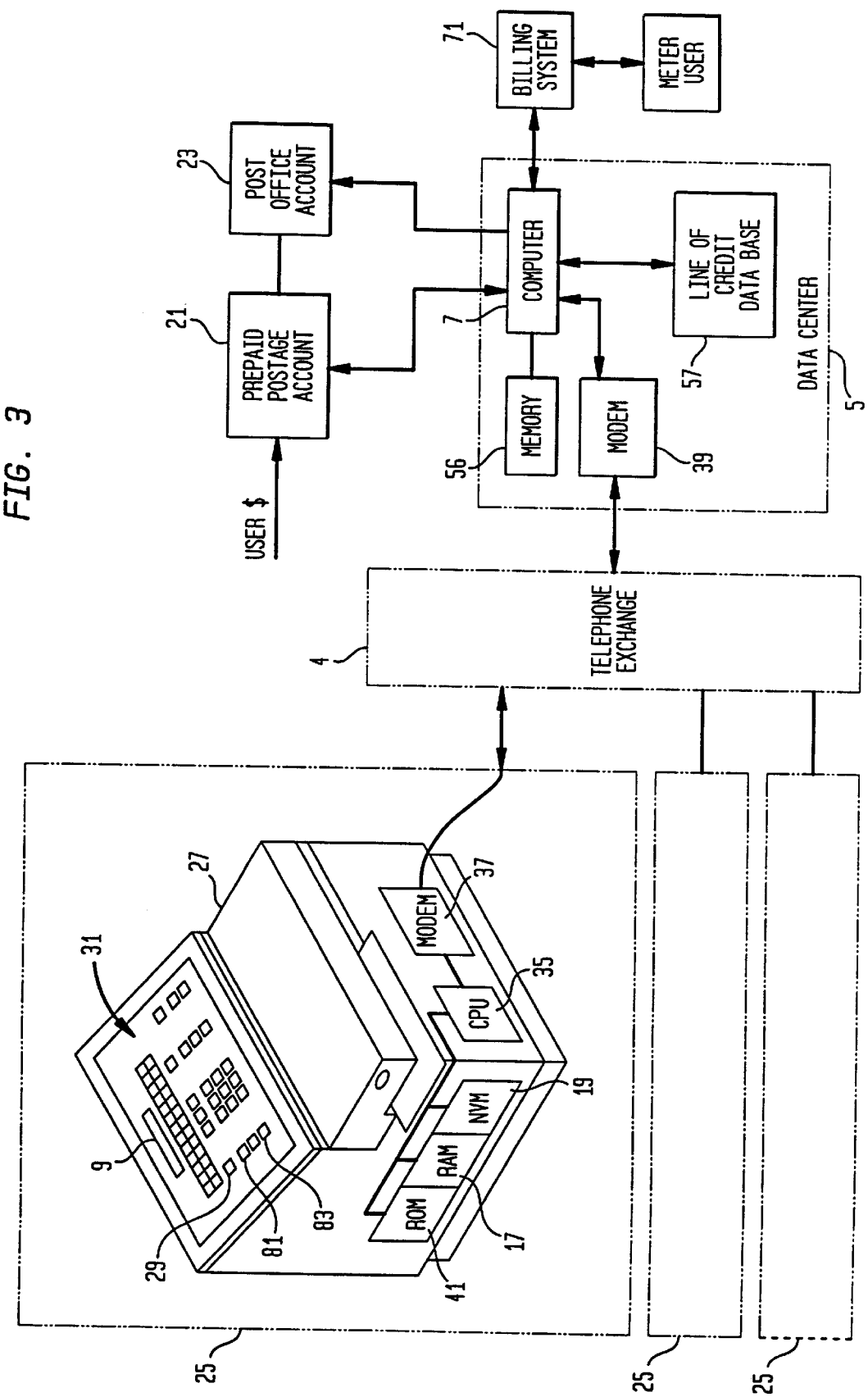
FIG. 3 is a schematic block diagram of a first embodiment of the inventive postage meter resetting system.
Figure 4:
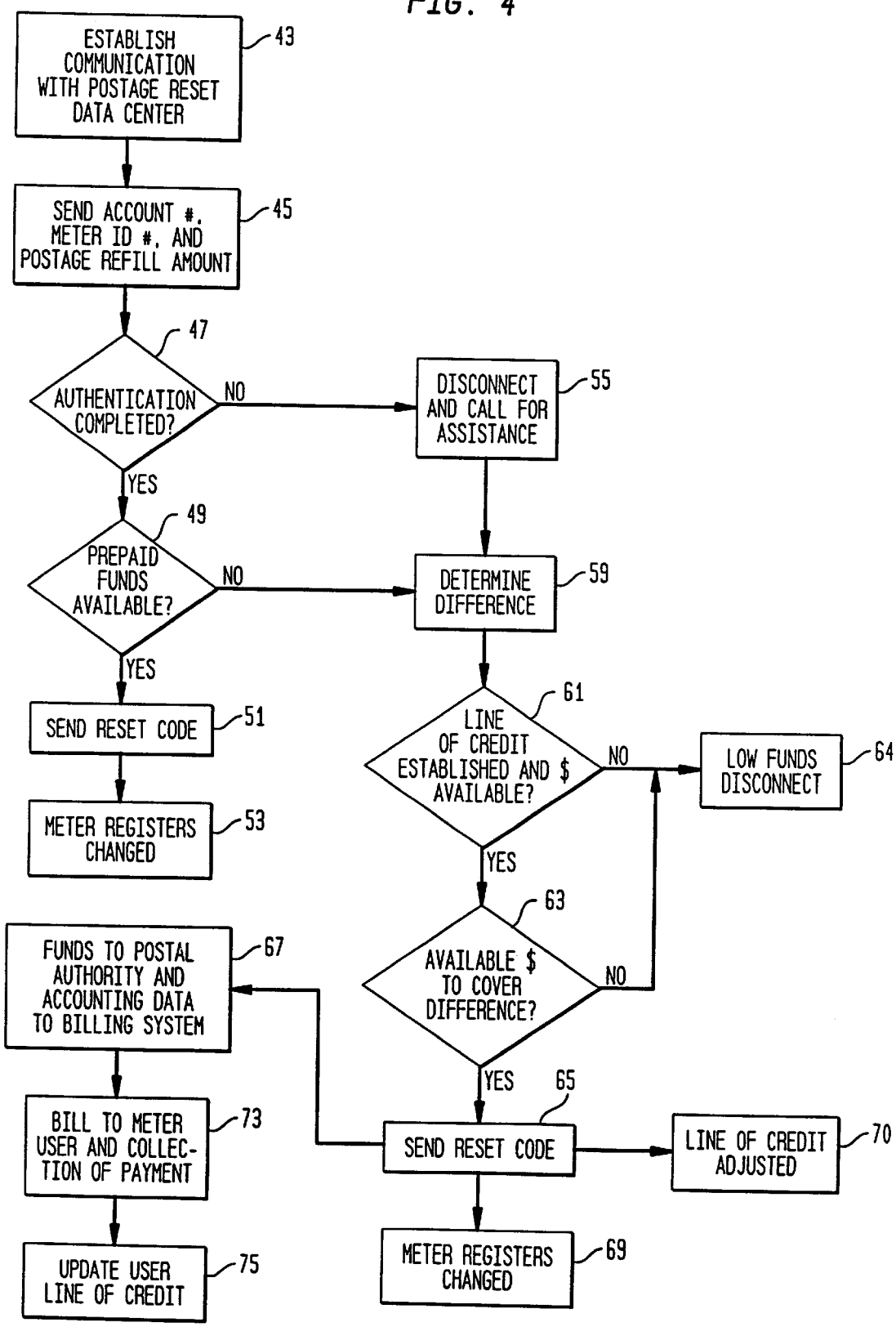
FIG. 4 is a flowchart detailing the operation of the system of FIG. 3.

Referring to FIGS. 3 and 4, an improved postage metering resetting system is described hereinbelow. However, in order to be concise and not repeat previously described details, the operation and structure of postage meter 27 is essentially the same as that of FIG. 2 except for specific features to be described later which are effectuated by programming stored in ROM 41. Thus, with particular reference to FIG. 4, when a request for a postage refill is initiated by pressing key 29, the establishment of communication with the data center (step 43), the sending of account number/meter serial number/refill amount from the meter 27 to data center 5 (step 45), the authentication of the call by data center 5 (step 47), and the determination by computer 7 via communication with prepaid postage account data center 21 as to whether sufficient funds are available in the user account to cover the requested postage (step 49) are all accomplished as discussed in connection with the system of FIG. 2. Moreover, if sufficient funds are available, the processes and structure for accomplishing debiting of the user account, payment to the post office account 23 of the debited amount, generation and comparison of combination codes (step 51) and resetting of the accounting registers in postage meter 27 (step 53) are all accomplished as described in FIG. 2. Additionally and as described for the system of FIG. 2, if the authentication of step 47 is not successfully completed, at step 55 the user is advised via display 9 to call for assistance and the reset transaction is terminated.

In the event however that at step 49 it is determined that the user account has insufficient funds to cover the requested postage to be added to postage meter 27, computer 7 determines the difference between the postage requested and the amount in the user account (step 59). Then, the system of FIG. 3 utilizes a program stored in a memory 56 which directs computer 7 to access a line of credit data base 57 which is resident at the data center 5. The line of credit data base 57 has stored therein a predetermined line of credit for each user who has been preapproved for such a line of credit. The line of credit associated with each preapproved user account number has a predetermined limit which can vary for each user. Thus, when computer 7 queries the line of credit data base 57 it determines if a line of credit has been established for that user (identified for example by the user account number) (step 61). If a line of credit has not been established, computer 7 sends a message to the user that is displayed on display 9 indicating that sufficient funds are not available and terminating the refill transaction (step 64). If however, at step 61, it is determined that a line of credit has been established for the user, computer 7 determines how much money is currently available in the line of credit and whether such amount is sufficient enough to cover the difference between the requested postage addition and the funds available in the prepaid user account (step 63). If the answer to the inquiry at step 63 is yes, computer 7 calculates and sends the reset code (combination code) to CPU 35 in the same manner as discussed in connection with FIG. 2 (step 65), effectuates the transfer of funds equal to the calculated difference from a funding source of the data center owner to the post office account 23 to pay for the postage associated with the calculated difference and sends information concerning the credit extended to the user to a billing data center 71 (step 67), and adjusts the line of credit available to the user in the data base 57 to account for the calculated difference paid by the data center owner on behalf of the user (step 70). The billing center 71 then bills the user for the credit extended, receives payment from the user for such credit (73), and upon receipt of payment communicates with computer 7 to permit computer 7 to update the available user credit line taking into account the payment received (step75). As previously discussed, CPU 35 utilizes the reset code received from Computer 7 to change the meter registers to reflect the addition of the desired postage funds (step 69).

While the above-described embodiment of FIGS. 3 and 4 sets forth one such inventive system, numerous alternative embodiments are possible. For example, programs can be added to memory 56 such that if the answer to the inquiry at step 63 is "yes", the automatic use of the line of credit does not occur. Rather, computer 7 sends a message to postage meter 27 which message is displayed in display 9. The message advises the user that the prepaid postage account has insufficient funds to cover the requested postage refill amount but that their line of credit is sufficient to permit the transaction to be completed if the user wishes to utilize the line of credit. The user would then press one of designated keys 81, 83 of keyboard 31 to respectively indicate "yes" or "no" concerning whether they want to utilize their preapproved line of credit. If the answer is "No", the transaction is terminated and if the answer is "yes", the steps previously described for adding postage to the postage meter 27 and the associated accounting is completed.

In yet another embodiment, if the answer to the inquiry at step 63 is "yes", computer 7 is programmed to advise the user via display 9 of the amount of funds available in the prepaid user account, the amount of credit available in the line of credit, and the difference between those two amounts. The user would then have the options of 1) only adding funds to the postage meter equal to the available funds in the prepaid user account, 2) electing to have the full postage amount recharged by utilizing the line of credit and the prepaid postage amount, and 3) designating a new amount of postage to be added to the postage meter and identifying what portions of the new postage amount should be taken from the prepaid postage account and charged to the line of credit. This provides the postage meter user with great flexibility in managing the cash flow associated with recharging of their postage meter. It is submitted that one skilled in the art is familiar with the programming required to implement the menu driven options discussed above such that effective communication between the computer 7 and the postage meter 27 occurs. Moreover a program in ROM 41 provides the necessary logic required to associate the pressing of selected keys on keyboard 31 with the desired response of the user in response to the computer 7 questions displayed in display 9.

In still another embodiment, memory 56 has a program stored therein which will provide the user with an option if the answer to the inquiry at step 63 is "NO". That is, computer 7, via display 9, will advise the user of the amount of funds available in the prepaid account and the amount of credit available in the line of credit. Since the sum of the available credit and the prepaid funds is not sufficient to cover the desired postage recharge amount, the user can change, via keyboard 31, the desired postage recharge amount to a value that falls within the sum of the available prepaid funds and the available line of credit. If this is done the process continues along the "yes" branch of the inquiry at step 63.

Figure 5:
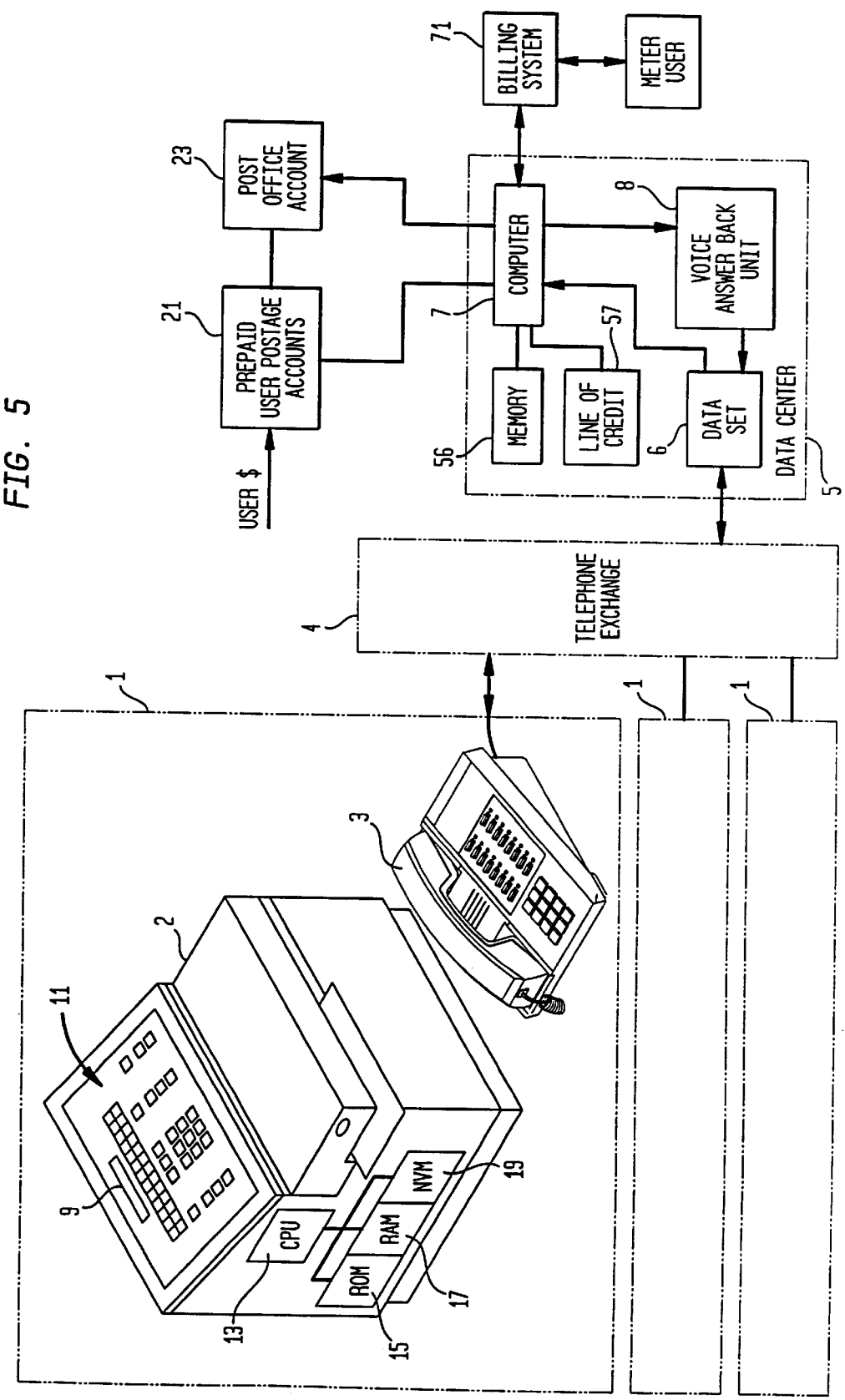
FIG. 5 is a schematic block diagram of a second embodiment of the inventive postage metering system.

Referring to FIG. 5, the invention of FIG. 3 is shown as being set forth in a system which uses a voice answer back unit 8. Thus, the difference between this configuration and that of FIG. 3 is that communication takes place between computer 7 and telephone 3 instead of directly with the postage meter. Accordingly, the various options that can be presented to the user as discussed immediately above are now voice commands generated by the computer 7. Responses by the user would be provided by pressing the keypad of the telephone 3.

Another unique feature of the systems of FIGS. 3 and 5 is that the user can obtain at least one or even all of the current amount of prepaid postage funds available, the line of credit amount available and the sum of these values by performing a zero dollar refill. That is, when a recharge request of zero dollars is received by the computer 7, it is programmed to obtain and calculate the aforementioned information and automatically provide this information to the user. In the embodiment of FIG. 3 the information is displayed on display 9 while in the embodiment of FIG. 5 the voice response unit sends back the information to telephone 3.

Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims. For example, while the preferred embodiments show the line of credit data base as being co-located at the data center to permit hard-wired communication with computer 7, it could also be remotely located and communications accomplished via telephone modems. Similarly the prepaid postage account database, and the billing system could all be part of the physical data center. Finally, while the alternate source of funds is a line of credit, it could also be a second funded account.

What is claimed is:

1. A postage recharge system comprising:
  a data center including
    means for receiving from a postage meter first data indicative of a first user prepaid postage account resident in a prepaid postage account data base having a plurality of prepaid postage accounts together with a request to recharge the postage meter by a postage recharge amount;
    a line of credit database having a plurality of lines of credit each of which is associated with at least one of the plurality of prepaid postage accounts;
    a computer, in communication with the receiving means, which is programmed to 1) obtain the first data and the postage recharge amount from the receiving means, and 2) communicate with the prepaid postage account data base to determine if an amount of prepaid funds in the first user prepaid postage account is at least equal to the postage recharge amount, wherein at times when the computer determines that the amount of prepaid funds is not at least equal to the postage recharge amount the computer is programmed to automatically 1) communicate with the line of credit data base to determine if one of the plurality of lines of credit is a first user line of credit that is associated with the first user prepaid postage account, 2) ascertain a credit amount available in the first user line of credit, and 3) generate and send enabling data to the postage meter via the receiving means and the sending means only if the computer determines that between the credit amount available and the amount of prepaid funds, the request to recharge the postage meter by the postage recharge amount should be honored.

2. A method for resetting, via data center, a postage meter with a postage recharge amount, the method comprising:
  receiving at the data center first data indicative of a first user prepaid postage account resident in a prepaid postage account data base having a plurality of prepaid postage accounts together with a request to recharge the postage meter by the postage recharge amount;
  the data center communicating with the prepaid postage account data base to determine if an amount of prepaid funds in the first user prepaid postage account is at least equal to the postage recharge amount;
  wherein at times when the data center determines that the amount of prepaid funds is not at least equal to the postage recharge amount the data center performs functions of communicating with a line of credit data base for determining if a first user line of credit associated with the first user prepaid postage account is established, ascertaining a credit amount available in the first user line of credit, and generating and sending enabling data to the postage meter only if the data center determines that between the credit amount and the amount of prepaid funds the resetting of the postage meter by the postage recharge amount should be accomplished.

* * * * *